V. E. REICHARD.
EMERGENCY TIRE FOR AUTOMOBILES.
APPLICATION FILED JULY 26, 1915.
1,183,321.
Patented May 16, 1916.
2 SHEETS—SHEET 1.
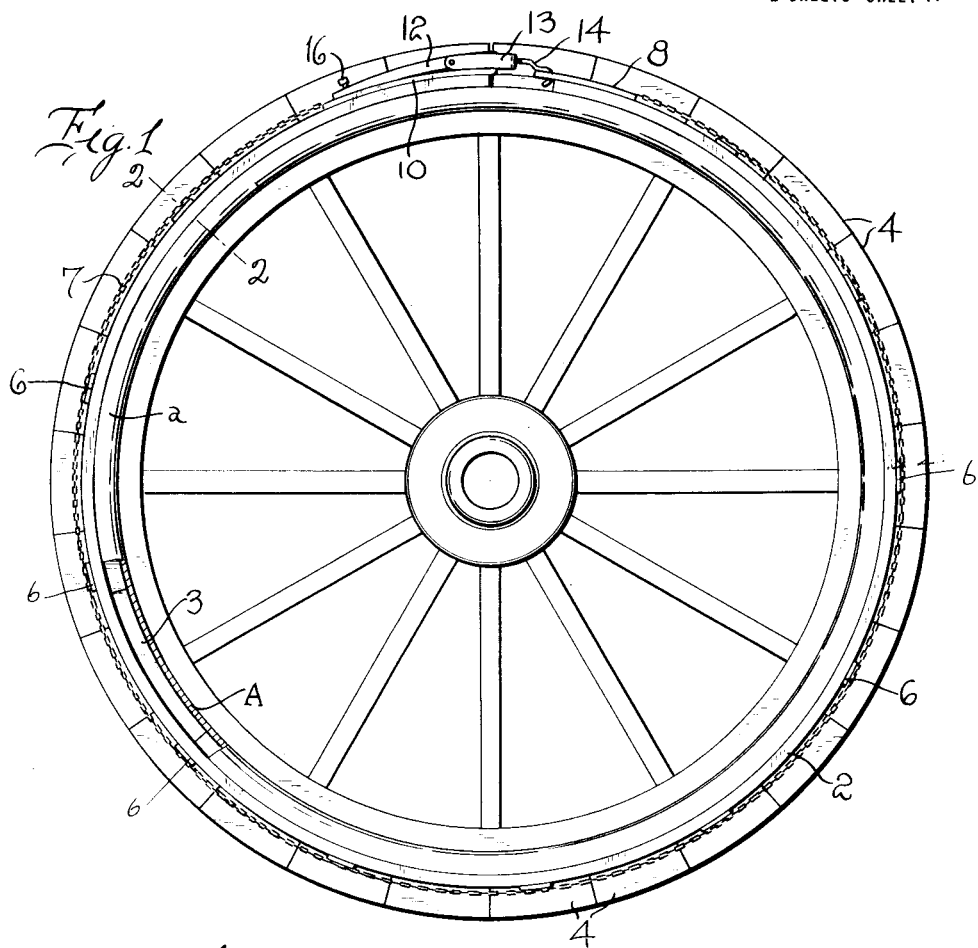
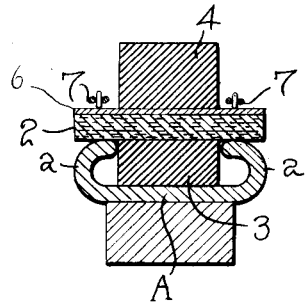
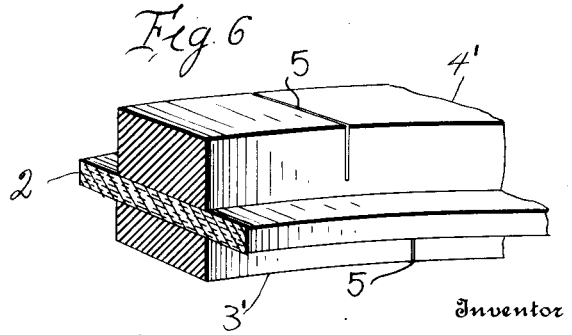
Inventor
V. E. REICHARD
By Watson E. Coleman
Attorney

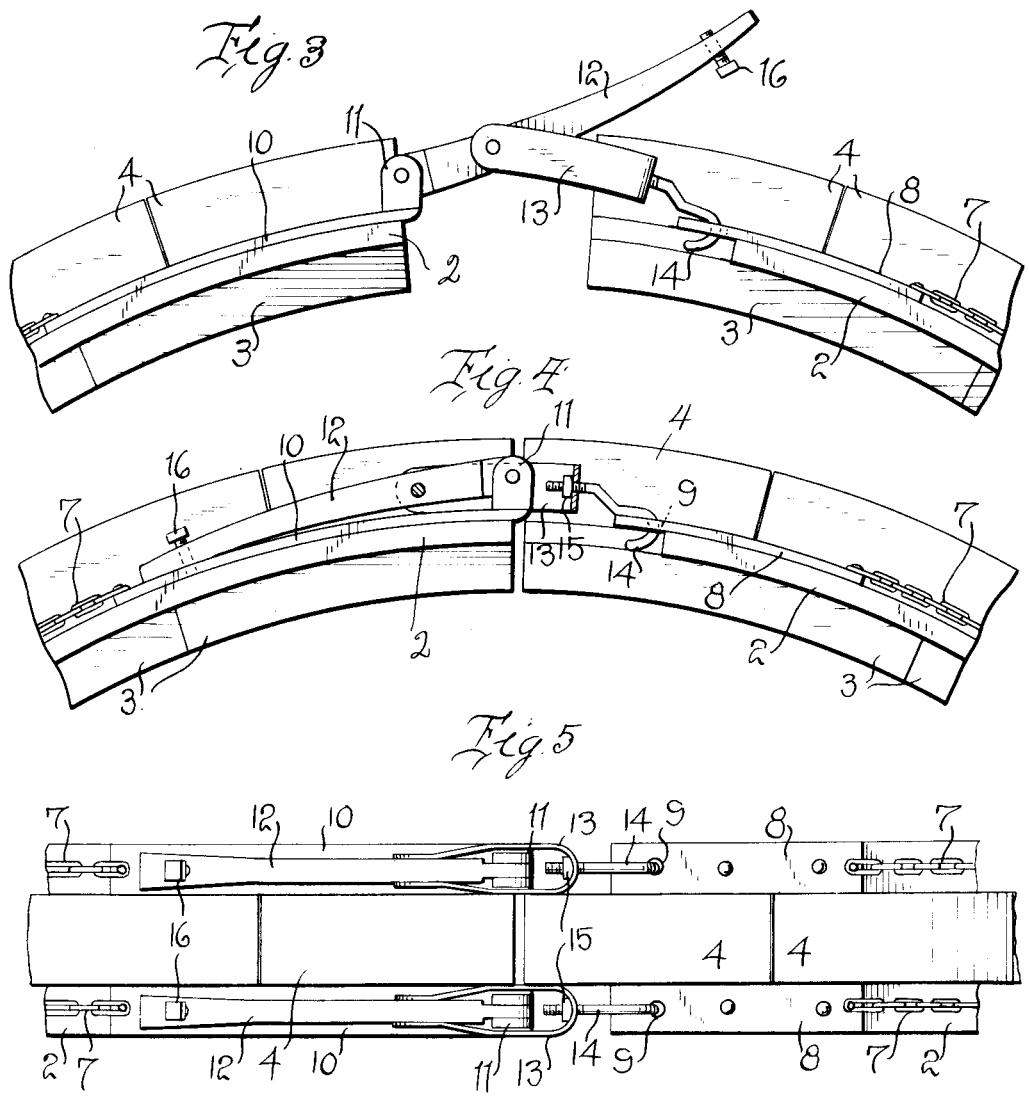

UNITED STATES PATENT OFFICE.

VERN E. REICHARD, OF PERRY, NEW YORK.

EMERGENCY-TIRE FOR AUTOMOBILES.

1,183,321. Specification of Letters Patent. Patented May 16, 1916.

Application filed July 26, 1915. Serial No. 41,964.

*To all whom it may concern:*

Be it known that I, VERN E. REICHARD, a citizen of the United States, residing at Perry, in the county of Wyoming and State of New York, have invented certain new and useful Improvements in Emergency-Tires for Automobiles, of which the following is a specification, reference being had to the accompanying drawings.

This invention relates to automobile tires, and particularly to a tire which is adapted to be disposed upon the wheel of an automobile in case of an emergency, as when the pneumatic tire is punctured or a blow-out occurs.

The primary object of my invention is the provision of an emergency tire, very simple in construction, which is effective in operation, and which may be placed upon the felly or rim of an automobile wheel with a minimum of trouble and time.

A further object of the invention is to so construct the tire that it will be expansible and contractible so that it may be readily placed over a wheel rim and then contracted into place or as readily displaced.

A further object is to provide means whereby the length of the emergency tire may be decreased or increased so that when it is contracted it will fit different diameters of rims.

A further object is to construct the tire so that it will have a certain cushioning effect and may be used to take the place temporarily of a pneumatic tire.

Other objects relate to the details of construction of the means for locking the tire upon the rim.

Other objects will appear in the course of the following description.

Figure 1 is an elevation, with a portion broken away, of a wheel with my emergency tire applied thereto; Fig. 2 is a cross sectional view on the line 2—2 of Fig. 1; Fig. 3 is a side elevation of a portion of the emergency tire before it is contracted upon the wheel; Fig. 4 is a like view to Fig. 3, but showing the tire contracted, the adjacent yoke being in section; Fig. 5 is a plan view of the construction shown in Fig. 4; and Fig. 6 is a sectional perspective view of a modified manner of forming the tread members.

Referring to the drawings it will be seen that my emergency tire comprises a base strip of canvas, leather, or rubber, designated 2. This base strip has a length approximately equal to the circumference of the wheel with which the tire is to be used, and has a width equal to the width of the tire engaging flanges of the rim, so that when the tire is in place it will rest upon these flanges as illustrated in Fig. 2. To the inner side of this canvas strip there is attached a plurality of blocks of leather, rubber, or other suitable material, rubber being preferably used as being more resilient, these blocks being designated 3, and upon the outer face of the strip 2 is secured in any suitable manner a plurality of blocks 4 also of rubber, leather or other material.

While I have illustrated a plurality of blocks 3 and 4 it will be understood that members 3' and 4' might be formed by providing a continuous strip of material as in Fig. 6, and forming radial kerfs 5 at regular distances, thus accomplishing the same end. About every four inches along the strip 2 and extending across the strip are disposed the sheet metal plates 6 whereby the strip is stiffened at its margins and these plates also afford a means for the attachment of the reinforcing chains or cables 7 which extend the full length of the strip. Attached to one end of the strip on each side of the adjacent blocks 4 and preferably attached to the chains or cables 7 are the strips 8 which are formed with perforations 9. These strips or plates 8 may be integral with each other and extend entirely across the face of the strip 2 and are preferably disposed so that the perforations are arranged beyond the corresponding end of the strip 2 but inward of the end of the blocks 3 and 4. Mounted upon the other end of the strip 2 and preferably connected to the extremities of the chains or cables 7 are the hinge leaves 10 which at their outer ends are outwardly turned to form bifurcated ears 11. Pivotally connected in each of these bifurcated ears 11 is a clamping lever 12 to an intermediate portion of which is pivoted the loop or bail 13. This loop or bail is U-shaped in form and carried upon it is the hook 14 which engages with the perforation 9 in one of the plates 8. Preferably this hook 14 extends through the bail and is screw threaded and adapted to be engaged by a nut 15 whereby the hook may be extended out from the loop 13 or contracted to thus increase or decrease the diameter of the emergency tire. As before stated, there are two of these levers 12, each with its corresponding bail and hook 14 and preferably each lever 12 is held in its locked position by means of a set screw 16.

The operation of this invention will be obvious from what has gone before. If a pneumatic tire becomes punctured or otherwise injured so that it has to be removed and there is no other tire to be placed upon the wheel, the emergency tire is brought into use. This is disposed around the wheel rim so that the blocks 3 will rest between the flanges a of the wheel rim A and with the strip 2 resting upon the flanges a. After this is accomplished the clamping levers 12 are turned down to the position shown in Fig. 4, thus drawing the ends of the tire together and clamping the emergency tire firmly upon the wheel. The levers are then locked by any suitable means, as by means of the set screw 16 so that they cannot accidentally move out of operative position.

By turning up upon the nuts 15 the hooks 14 may be adjusted so as to permit the tire to be used for larger or smaller wheels. It will be noted that the blocks 3 prevent any sidewise movement of the tire relative to the rim, and that the chains or cables 7 will not stretch and thus the tire may be firmly clamped upon the wheel and it will further be noted that the position of the yoke 13 is such with relation to the curved lever 12 that any pull upon the yoke tends to urge this lever to its closed position when the lever has been turned over to its locking position. In other words, the point of pivotal engagement of the yoke 13 with the lever is inward of the pivotal axis 11 of the hinge on which the lever turns. Of course the levers, arms, etc., are disposed inward of the periphery of the blocks 4 so that they are prevented from contact with the ground.

By forming the base 2 of canvas and attaching thereto separate blocks 4, or by using the construction shown in Fig. 6, I secure flexibility of the tire so that it may be readily rolled up and so that it will conform exactly to the wheel rim.

It will be noted that the strips 6 prevent the strip 2 from flexing transversely in turning up. The strips 6 are necessary if the strip 2 is made of material such as canvas.

Having thus described my invention, what I claim is:

1. An emergency tire comprising a strip of flexible material having a width equal to that of a wheel rim, members attached to the inner face of the strip and adapted when the tire is in place to engage between the flanges of the wheel rim to prevent lateral shifting of the tire, a tread carried by the outer face of the strip, reinforcing connections extending along the strip on each side of the tread, and means disposed on the confronting ends of the strip and tread for contracting the tire and locking it upon the wheel rim.

2. An emergency tire comprising a supporting base and a tread carried thereby, eyes attached to one end of the supporting base on opposite sides of the tread, hinge leaves attached to the other end of the supporting base on each side of the tread, levers pivoted to said hinge leaves for movement into or out of parallel relation thereto, U-shaped clips pivotally connected to the levers, and hooks attached to the U-shaped clips and adapted to engage with the eyes.

3. In an emergency tire, a flexible base having a plurality of tread members attached to the outer face thereof and less in width than the base and having a plurality of members attached to the inner face thereof and adapted to be disposed between the flanges of the wheel rim, flexible non-yielding connections attached to the base and conterminous therewith and disposed on each side of the tread members, plates attached to the base at one end projecting beyond the base and being formed with eyes on their projecting ends, said plates being attached also to said non-yieldable connections, hinge leaves adapted to be mounted on the other end of the base and attached to said connections and having outwardly turned ears, clamping levers pivoted to said ears, U-shaped clips pivotally connected to the clamping levers, and hooks mounted on said U-shaped clips, said hooks being adjustable as to length and adapted to engage with the eyes in the plates.

In testimony whereof I hereunto affix my signature in the presence of two witnesses.

VERN E. REICHARD.

Witnesses:
CARLOS J. TOAN,
C. N. READ.